US007247834B2

(12) United States Patent
Fujita

(10) Patent No.: US 7,247,834 B2
(45) Date of Patent: Jul. 24, 2007

(54) PHOTOELECTRIC SENSOR FOR DETECTING PRESENCE/ABSENCE OF OBJECT

(75) Inventor: Kouji Fujita, Yao (JP)

(73) Assignee: Hosiden Corporation, Yao-shi (JP)

( * ) Notice: Subject to any disclaimer, the term of this patent is extended or adjusted under 35 U.S.C. 154(b) by 41 days.

(21) Appl. No.: 10/684,484

(22) Filed: Oct. 15, 2003

(65) Prior Publication Data
US 2004/0089791 A1 May 13, 2004

(30) Foreign Application Priority Data
Nov. 8, 2002 (JP) ............... 2002-326030

(51) Int. Cl.
*G06M 7/00* (2006.01)
*H01J 40/14* (2006.01)
(52) U.S. Cl. ...................... 250/221; 340/555
(58) Field of Classification Search ........... 250/221, 250/222.1, 205, 559.4, 341.1, 341.7, 349, 250/342, 353; 340/555–557
See application file for complete search history.

(56) References Cited
U.S. PATENT DOCUMENTS

| | | | | |
|---|---|---|---|---|
| 4,409,473 A | | 10/1983 | Furuta et al. ............... 250/206 |
| 4,808,809 A | | 2/1989 | Hayakawa ................... 250/205 |
| 5,043,565 A | | 8/1991 | Gleim ........................ 250/205 |
| 5,142,152 A | * | 8/1992 | Boiucaner ................ 250/341.7 |
| 5,225,669 A | * | 7/1993 | Hasch et al. .......... 250/214 AL |
| 5,459,312 A | * | 10/1995 | Gurner et al. ............... 250/221 |
| 5,637,040 A | * | 6/1997 | Kim et al. ................... 454/256 |
| 6,166,371 A | * | 12/2000 | Milbrath et al. ............. 250/221 |
| 6,236,035 B1 | * | 5/2001 | Saar et al. ................... 250/221 |
| 6,262,407 B1 | * | 7/2001 | Teder ......................... 250/205 |
| 6,693,273 B1 | * | 2/2004 | O'Connor et al. ........... 250/221 |
| 2001/0045512 A1 | * | 11/2001 | Brent ......................... 250/221 |

FOREIGN PATENT DOCUMENTS

| | | |
|---|---|---|
| DE | 199 51 557 A1 | 5/2000 |
| EP | 1 136 846 A2 | 9/2001 |
| JP | 2002-168967 | 6/2002 |
| WO | WO 87/03700 | 6/1987 |

* cited by examiner

*Primary Examiner*—Georgia Epps
*Assistant Examiner*—Suezu Ellis
(74) *Attorney, Agent, or Firm*—Armstrong, Kratz, Quintos, Hanson & Brooks, LLP.

(57) ABSTRACT

An object of the present invention is to enable the detection of the presence/absence of an object over a plurality of detection areas without using a plurality of light-receiving devices and light-emitting devices. A sensor detects the presence/absence of an object in a detection area where a light-emitting area of a light-emitting device and a light-receiving area of a light-receiving device are overlapped with each other, and includes: a power supply unit that outputs a driving current I of the light-emitting device such that its current value is variable; a control unit that has the function of controlling the power supply unit to change in magnitude of the driving current I of the light-emitting device, and determining the presence/absence of an object based on an output from the light-receiving device to output the result of determination as a detection signal; and an output signal 50 that converts the detection signal into an analog signal to output the converted signal as a signal α.

3 Claims, 6 Drawing Sheets (A)

(B)

PHOTOELECTRIC SENSOR FOR DETECTING PRESENCE/ABSENCE OF OBJECT

BACKGROUND OF THE INVENTION

1. Field of the Invention

The present invention relates to a photoelectric sensor for detecting the presence/absence of an object using a light-emitting device and a light-receiving device.

2. Description of the Related Art

This kind of photoelectric sensor has a basic configuration of detecting the presence/absence of an object in a detection area where a light-emitting area of a light-emitting device and a light-receiving area of a light-receiving device are overlapped with each other. More specifically, when an object passes through the detection area, light emitted from the light-emitting device is reflected from the object, and is received by the light-receiving device. As a result, a level of a signal output from the light-receiving device is changed, so that the intrusion of the object is detected.

The detection area is determined by the positional relationship between the light-emitting device and the light-receiving device, the orientation of the light-emitting device and the light-receiving device, and the like. When a plurality of light-emitting devices and light-receiving devices is used, the presence/absence of an object can be detected over a plurality of detection areas (see Japanese Patent Laid-Open Publication No. 2002-168967, for example).

However, in the case where a plurality of light-emitting devices and light-receiving devices is used, there is a problem in that it is very difficult to realize miniaturization and cost-reduction of an apparatus.

SUMMARY OF THE INVENTION

The present invention is devised in view of the above circumstances, and aims to provide a photoelectric sensor capable of detecting the presence/absence of an object over a plurality of detection areas without using a plurality of light-emitting devices and light-receiving devices.

According to an aspect of the present invention, there is provided a photoelectric sensor for detecting the presence/absence of an object in a detection area where a light-emitting area of a light-emitting device and a light-receiving area of a light-receiving device are overlapped with each other, the photoelectric sensor comprising: a power supply unit that outputs a driving current of the light-emitting device such that its current value is variable; and a control unit that controls the power supply unit in order to change in magnitude of the driving current of the light-emitting device.

For example, the control unit is configured to have the function of controlling the power supply unit to change in magnitude of the driving current of the light-emitting device, and determining the presence/absence of an object based on an output from the light-receiving device to output the result of determination as a digital or analog detection signal.

Preferably, the control unit is configured to have the function of repeatedly changing in magnitude of the driving current of the light-emitting device in a predetermined pattern.

According to another aspect of the present invention, there is provided a photoelectric sensor for detecting the presence/absence of an object in a detection area where a light-emitting area of a light-emitting device and a light-receiving area of a light-receiving device are overlapped with each other, the photoelectric sensor being configured to allow the light-emitting device to emit light, compare an output level of the light-receiving device with a plurality of reference values different from one another, and output the result of comparison as a digital or analog detection signal.

According to still another aspect of the present invention, there is provided a photoelectric sensor for detecting the presence/absence of an object in a detection area where a light-emitting area of a light-emitting device and a light-receiving area of a light-receiving device are overlapped with each other, the photoelectoric sensor being configured to allow the light-emitting device to emit light, compare an output level of the light-receiving device with a reference value to output the result of comparison as a detection signal, change the reference value to compare the output level of the light-receiving device with the reference value in each change in the reference value, and output the result of comparison as a detection signal.

Preferably, the photoelectric sensor is configured to have the function of repeatedly changing the reference value in a predetermined pattern.

BRIEF DESCRIPTION OF THE DRAWINGS

FIG. 2A shows an output circuit for N-channel and FIG. 2B shows an output circuit for P-channel;

FIG. 3A shows the relationship between a control signal output from a control unit and a driving current of a light-emitting device and FIG. 3B shows the relationship between a control signal outnut from a control unit and an output signal;

DESCRIPTION OF THE PREFERRED EMBODIMENTS

Figure 1:
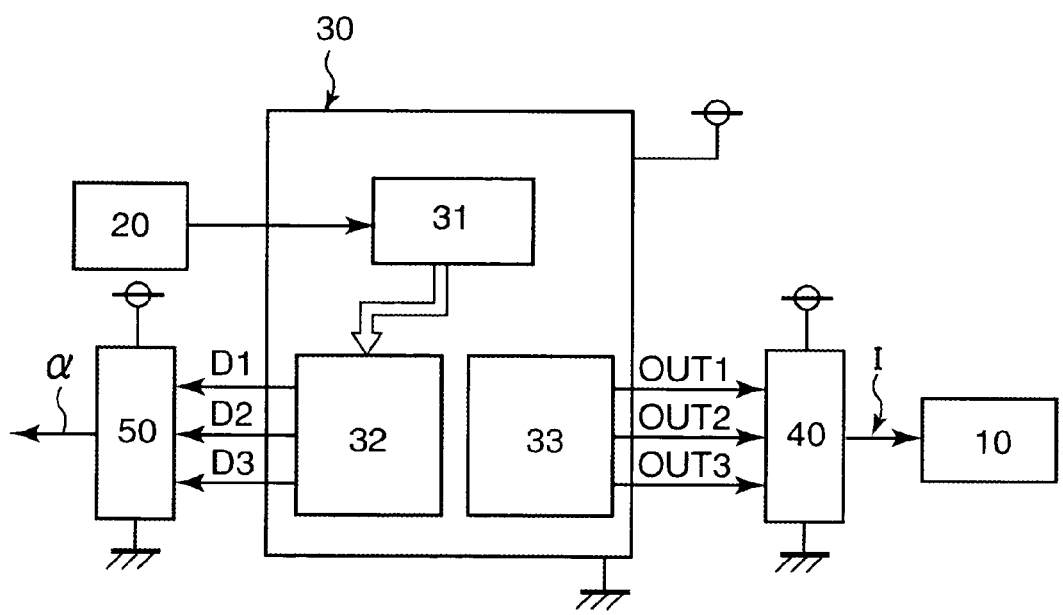
FIG. 1 is a block diagram of a photoelectric sensor for describing a first embodiment of the present invention.
Figure 2:
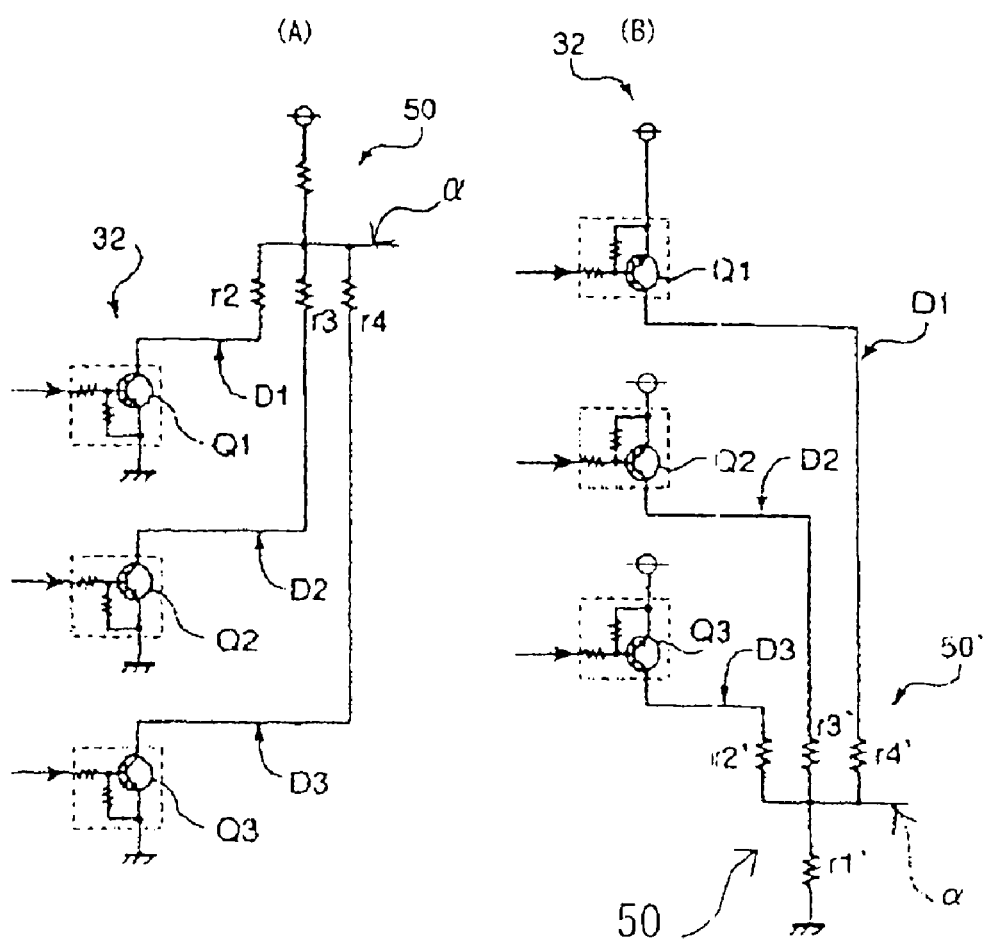
FIGS. 2A and 2B are circuit diagrams showing output circuits in the photoelectric sensor, particularly.
Figure 3:
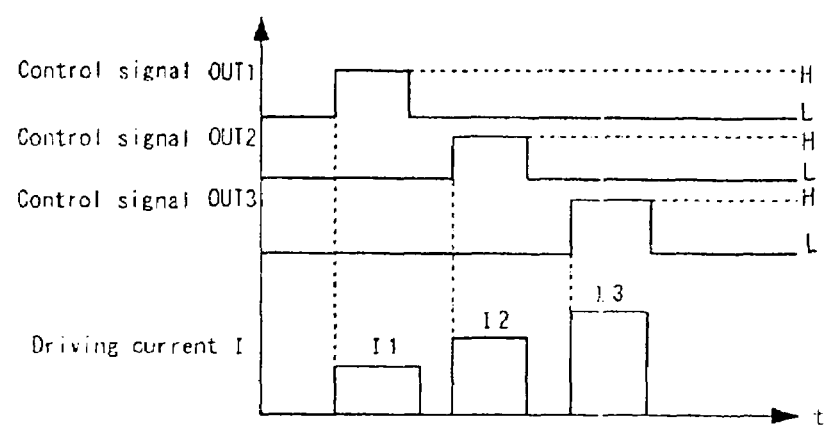
FIGS. 3A and 3B are timing charts in the photoelectric sensor showing operations of a power supply unit and the output circuit as shown in FIG. 2A, particularly.
Figure 3:
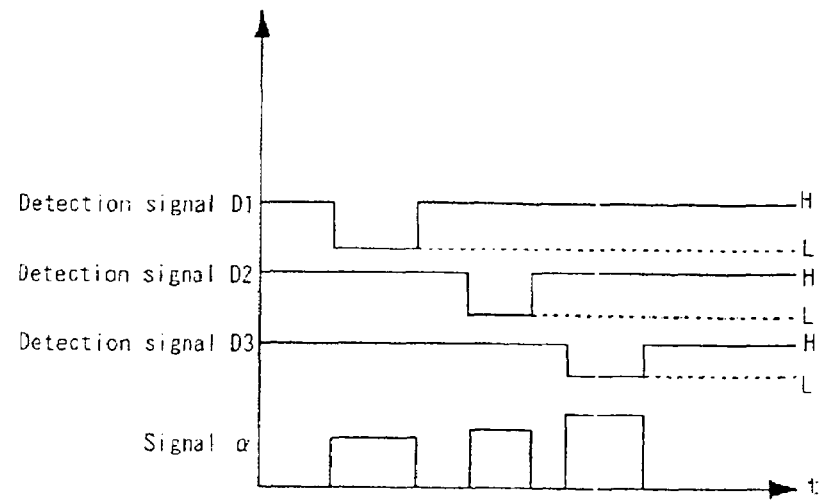

Hereinafter, description will be given of a first embodiment of the present invention with reference to FIGS. 1 to 4. FIG. 1 is a block diagram of a photoelectric sensor; FIGS. 2A and 2B are circuit diagrams showing output circuits in the photoelectric sensor, particularly, FIG. 2A shows an output circuit for N-channel and FIG. 2B shows an output circuit for P-channel; FIGS. 3A and 3B are timing charts in the photoelectric sensor showing operations of a power supply unit and the output circuit as shown in FIG. 2A, particularly, FIG. 3A shows the relationship between a control signal output from the control unit and a driving current of the light-emitting device: and FIG. 3B shows the relationship between a control signal output from a control unit and an output signal; and FIG. 4 is a view illustrating an object detection principle in the photoelectric sensor, which shows a detection area where a light-emitting area of a light-emitting device and a light-receiving area of a light-receiving device are overlapped with each other.

Figure 4:
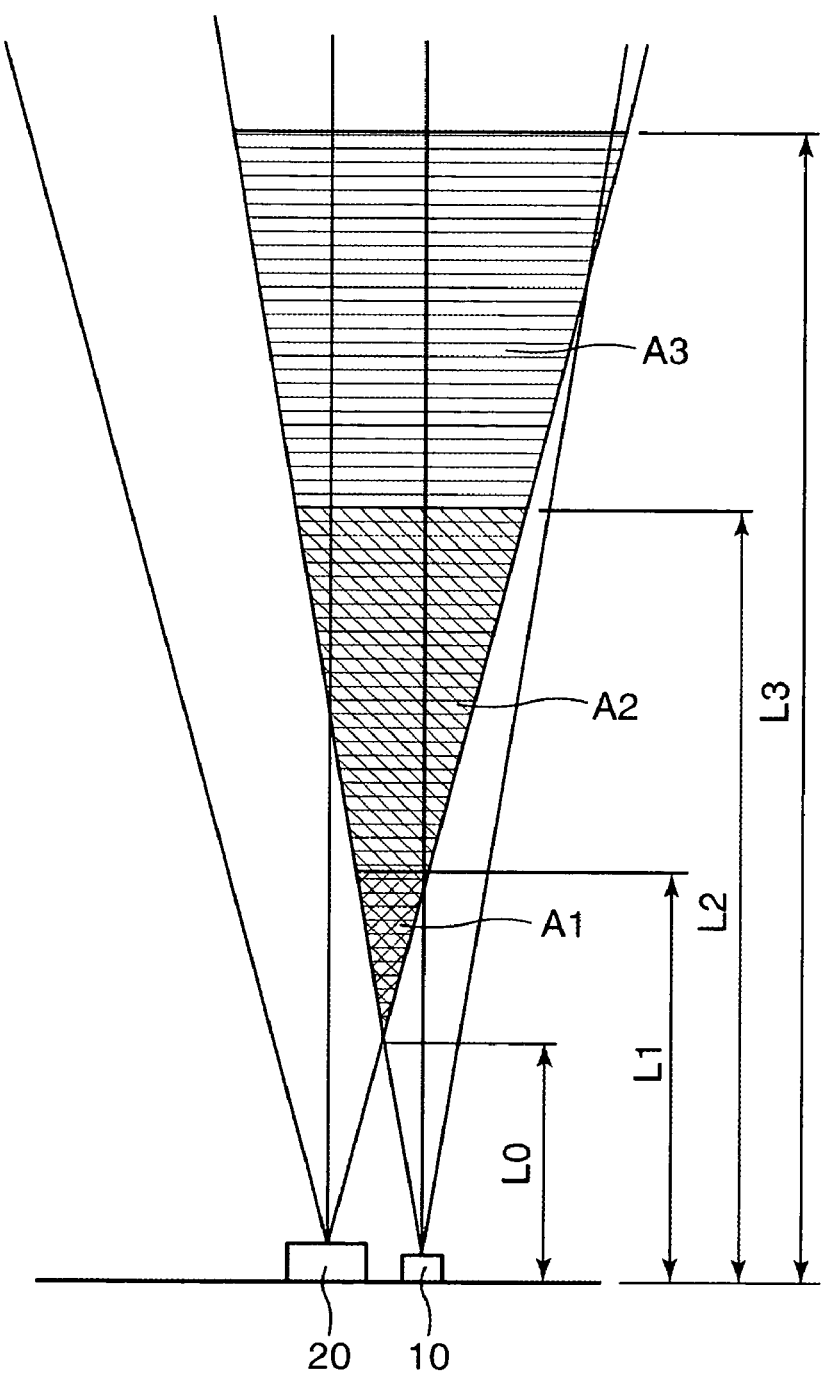
FIG. 4 is a view for describing an object detection principle in the photoelectric sensor, which shows a detection area where a light-emitting area of a light-emitting device and a light-receiving area of a light-receiving device are overlapped with each other.

As shown in FIG. 4, the photoelectric sensor described herein detects the presence/absence of an object in a detection areas A1, A2 or A3 where a light-emitting area of a light-emitting device 10 and a light-receiving area of a light-receiving device 20 are overlapped with each other. The photoelectric sensor can not only detect the presence/absence of proximity of an object but also measure a proximity distance at three levels. The detection area Al is located in front of the light-emitting device 10 and the light-receiving device 20 and corresponds to a portion from a distance L0 to a distance L1. Similarly, the detection areas A2 and A3 are located in front of the light-emitting device 10 and the light-receiving device 20 and correspond to a portion from the distance L0 to a distance L2 and a portion from the distance L0 to a distance L3, respectively.

As shown in FIG. 1, in addition to the light-emitting device 10 and the light-receiving device 20, the photoelectric sensor is configured to have: a power supply unit 40 that outputs a driving current I of the light-emitting device 10 such that its current value is variable; a control unit 30 that has the function of controlling the power supply unit 40 to change in magnitude of the driving current I of the light-emitting device 10, and determining the presence/absence of an object based on an output from the light-receiving device 20 to output the result of determination as digital detection signals D1, D2 and D3; and an output circuit 50 that converts the detection signal D1, D2 and D3 to an analog signal and outputs the converted signal as a signal α. Hereinafter, description will be given of each component in detail.

Herein, an LED for infrared rays and a phototransistor or a photodiode are used as the light-emitting device 10 and the light-receiving device 20, respectively. As shown in FIG. 4, the light-emitting device 10 and the light-receiving device 20 are arranged adjacent to each other. That is, when an object passes through the detection area A1, A2 or A3, light emitted from the light-emitting device 10 is reflected from the object, and is received by the light-receiving device 20. As a result, a level of voltage output from the light-receiving device 20 is increased and changed.

The power supply unit 40 is a circuit in which three constant-current circuits operating according to control signals OUT1, OUT2 and OUT3 output from the control unit 30 are connected in parallel. As shown in FIG. 3, when the control signals OUT1, OUT2 and OUT3 are at a high level (shown as "H" in FIGS. 3A and 3B), the magnitude of the driving current I is changed into I1, I2 or I3.

When the magnitude of the driving current I flowing through the light-emitting device 10 is I1, it is possible to detect the presence/absence of an object in the detection area A1 with the light-receiving device 20. Similarly, when the magnitude of the driving current I flowing through the light-emitting device 10 is I2 or I3, it is possible to detect the presence/absence of an object in the detection area A2 or A3 with the light-receiving device 20, respectively. This is based on characteristics of the light-emitting device in that the light intensity of the light-emitting device 10 is increased in proportion to the magnitude of the driving current.

The control unit 30 is configured to have a determination unit 31 that determines the intrusion of an object in the detection area A1, A2 or A3 when the output voltage of the light-receiving device 20 is equal to or less than a predetermined value; an output unit 32 that outputs the detection signals D1, D2 and D3 based on the result of determination by determination unit 31; and a light emission control unit 33 that repeatedly outputs the control signals OUT1, OUT2 and OUT3 in a pattern shown in FIG. 3 in order to control the power supply unit 40.

Herein, a microcomputer is used as the control unit 30 and configured to exert functions as the determination unit 31 and the light emission control unit 33 in such a manner that a program previously recorded in a built-in memory is executed by a CPU. Contents of the program will be described later.

The output voltage of the light-emitting device 20 is input through an analog input port of the microcomputer. The output unit 32 corresponds to an I/O of the microcomputer and the configuration shown in FIG. 2A or 2B. The configuration shown in FIG. 2A is for N-channel output and the configuration shown in FIG. 2B is for P-channel output. For both circuits, when transistors Q1, Q2 and Q3 are turned on, the detection signals D1, D2 and D3 respectively become active (active-low in the output circuit shown in FIG. 2A and active-high in the output circuit shown in FIG. 2B).

As shown in FIG. 2A, the output circuit 50 is a voltage dividing resistance circuit between a resistor r1 and resistors r2, r3 and r4 (r2<r3<r4), a division ratio is changed according to the detection signals D1, D2 and D3, and division voltage is output as a signal α. Similarly, the circuit shown in FIG. 2B is the voltage dividing resistance circuit between a resistor r1' and resistors r2', r3' and r4' (r4'<r3'<r2'), the division ratio is changed according to the detection signals D1, D2 and D3, and the division voltage is output as the signal α.

Then, description will be given of the operation and the object detection principle in the photoelectric sensor configured in the above-described way and, also, description will be given of the contents of the program processed by the control unit 30.

When a switch (not shown) is turned on, the control unit 30 sequentially outputs the control signals OUT1, OUT2 and OUT3 as shown in FIG. 3A. At the same time, the magnitude of the driving current I output from the power supply unit 40 is increased in order of I1, I2 and I3, and the light intensity of the light-emitting device 10 is correspondingly increased at three levels. This means that the light-emitting area of the light-emitting device 10 is substantially enlarged at three levels.

The control unit 30 receives the output voltage of the light-receiving device 20 during outputting the control signal OUT1. When the output voltage is equal to or more than the predetermined value, as shown in FIG. 3B. the control unit 30 determines that an object passes through the detection area A1 to make the detection signal D1 active . Similarly, the control unit 30 receives the output voltage of the light-receiving device 20 during outputting the control signals OUT2 and OUT2. When the output voltage is equal to or more than the predetermined value, the control unit 30 determines that an object passes through the detection area A2 or A3 to make the detection signal D2 or D3 active. Then, the output circuit 50 converts the digital value including the control signals OUT1, OUT2 and OUT3 into the analog value to output the analog signal α (see FIG. 3B).

The above-described processing is repeatedly carried out in the control unit 30. That is, as shown in FIG. 3A, the pattern is repeated such that the light intensity of the light-emitting device 10 is increased sequentially at three levels, the light intensity is recovered to an original state, and the light intensity is increased sequentially at three levels again. Whether an object passes through the detection area A1, A2 or A3 is sequentially determined based on the output voltage of the light-receiving device 20, and the result of determination is output as the digital detection signals D1, D2 and D3 as shown in FIG. 3B. Then, the output circuit 50 converts the detection signals D1, D2 and D3 into the analog signal α to output it.

With the voltage level of the signal α output from the photoelectric sensor, it is thus determined that whether an object passes through the detection area A1, A2 or A3. Specifically, when the object approaches to the photoelectric sensor, the detection signals D1, D2 and D3 are sequentially changed to active, and the voltage level of the signal α is correspondingly increased. Accordingly, seeing the voltage level of the signal α, the proximity distance of the object can be determined at three levels.

In the case of the photoelectric sensor configured in the above-described way, unlike in the case of the conventional example, it is possible to detect the presence/absence of the object over the detection areas A1, A2 and A3 without using a plurality of light-receiving devices 20 and light-emitting devices 10. The embodiment can realize the miniaturization and the cost-reduction of a photoelectric sensor in that the increase in the number of light-emitting devices 10 and light-receiving devices 20 is not required. Further, in the embodiment, not only input of an external signal is not required but also the analog output form is adopted, so that the configuration of a peripheral circuit can be simplified. Therefore, the miniaturization and the cost-reduction of the photoelectric sensor can be also realized.

The above-described photoelectric sensor may be designed as follows. For example, the detection signals D1, D2 and D3 is directly output as the analog signal α by utilizing the analog output port of the microcomputer in the control unit 30. The output of the light-receiving device 20 is directly externally output, and the control unit 30 is configured to have only the function of controlling the power supply unit 40 in order to change in magnitude of the driving current I of the light-emitting device 10. In this case, the magnitude of the driving current I of the light-emitting device 10 may be changed in the predetermined pattern or the power supply unit 40 may be controlled according to the input of the external signal. Further, the detection signals D1, D2 and D3 may be directly output in parallel without converting the detection signals D1, D2 and D3 into the analog signal or the same function may be realized by hardware without using the microcomputer. Particularly, an LED for infrared rays and a light-receiving IC for remote controllers can be used as the light-emitting device and the light-receiving device, respectively. That is, when a carrier wave (burst wave) having a constant wave length emitted from the LED for infrared rays is reflected from an object and, and is received by the light-receiving IC for remote controllers, so that the light-receiving IC for remote controllers detects the carrier wave having the constant wavelength, determining that the object is present in the detection area, a mode outputting the signal may be adopted. In this case, the signal is input to the control unit to carry out the same processing for the above-described way, and the signal may be output in the form of digital or analog, or the signal may be directly output.

Figure 5:
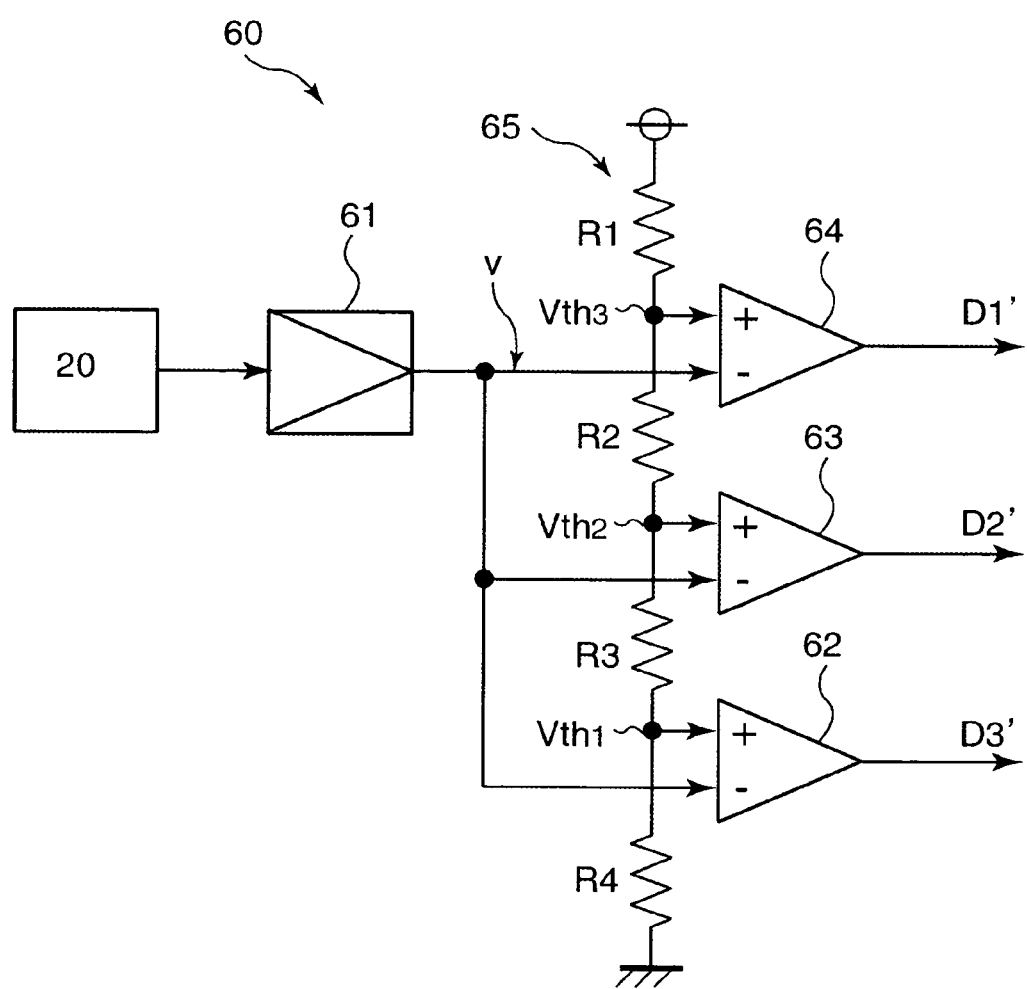
FIG. 5 is a circuit diagram of a detection circuit of the photoelectric sensor for describing a second embodiment of the present invention.
Figure 6:
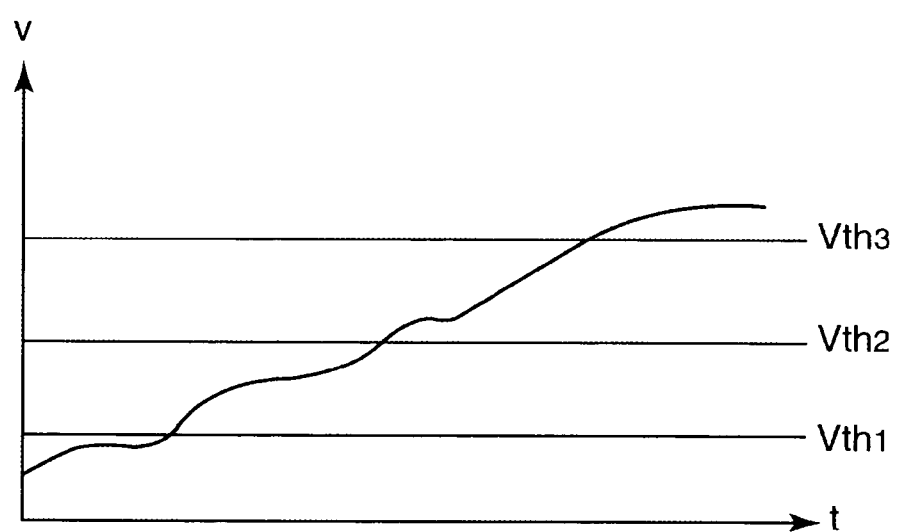
FIG. 6 is a view for describing an operation of a determination unit of the photoelectric sensor, which shows a waveform of output voltage of a buffer amplifier connected to an output stage of a light-receiving device.

Next, description will be given of a second embodiment of the present invention mainly with reference to FIGS. 5 and 6. FIG. 5 is a circuit diagram of a detection circuit of the photoelectric sensor; and FIG. 6 is a view for describing the operation of the detection circuit, which shows a waveform of output voltage of a buffer amplifier connected to an output stage of the light-receiving device. The same components in the first embodiment are denoted by the same part numbers in the first embodiment.

As shown in FIG. 4, a photoelectric sensor described herein detects the presence/absence of an object in the detection area A1, A2 or A3 where the light-emitting area of the light-emitting device 10 and the light-receiving area of the light-receiving device 20 are overlapped with each other. The photoelectric sensor can not only detect the presence/absence of proximity of an object but also measure the proximity distance at three levels. The second embodiment largely differs from the first embodiment in that the second embodiment has no unit corresponding to the power supply unit 40, the driving current I flowing through the light-emitting device 10 is held constant, and a detection circuit 60 shown in FIG. 6 is used instead of the control unit 30. In FIG. 6, the light-emitting device 10, the driving circuit generating the driving current I, and the like are not shown.

The photoelectric sensor is configured to allow the light-emitting device 10 to emit light, compare the output level of the light-receiving device 20 with three reference values $V_{th1}$, $V_{th2}$ and $V_{th3}$ ($V_{th1} < V_{th2} < V_{th3}$) which are different from one another, respectively, and output the result of comparison as digital detection signals D1', D2' and D3'. In order to allow the light-emitting device 10 to emit light, it is required to supply the driving current I to the light-emitting device 10. The magnitude of the driving current I is set to a value (I3) that light emitted from the light-emitting device 10 can reach the entire detection area A3. The detection circuit 60 generates the digital detection signals D1', D2' and D3' based on an output from the light-receiving device 20.

The detection circuit 60 is configured to have: a buffer amplifier 61 that amplifies the output from the light-receiving device 20; a reference voltage generating circuit 65 that is a voltage dividing resistance circuit for a resistor R1 to a resistor R4 and generates the reference values $V_{th1}$, $V_{th2}$ and $V_{th3}$; and comparators 62, 63 and 64 that compare the magnitude of an output voltage v of the buffer amplifier 61 with the reference values $V_{th1}$, $V_{th2}$ and $V_{th2}$ to output the result of comparison as digital detection signals D3', D2' and D1'.

Description will be given of the operation and the object detection principle in the photoelectric sensor configured in the above-described way. When the switch located outside the figure is turned on, the driving current I is supplied to the light-emitting device 10 and the light having the constant intensity is emitted from the light-emitting device 10. When an object passes through the detection areas A3, A2 and A1 in this order with the increasing proximity to the photoelectric sensor, the output level of the light-receiving device 20 is increased as shown in FIG. 6. This is because the intensity of the reflected light received with the light-receiving device 20 is increased in inverse proportion to the distance between the object and the light-emitting device 10 and the light-receiving device 20. When the output voltage v of the buffer amplifier 61 correspondingly exceeds the reference values $V_{th1}$, $V_{th2}$ and $V_{th3}$ in this order, the detection signals D3', D2' and D1' sequentially become active. In this case, the detection signals D3', D2' and D1' sequentially become H level herein. Conversely, the magnitude of the reference values $V_{th1}$, $V_{th2}$ and $V_{th3}$ is set so that the detection signals D3', D2' and D1' become active in order at the point when an object passes through the detection area A3, A2 and A1 in this order.

With the digital values of the detection signals D1', D2' and D3' output from the photoelectric sensor, it is thus determined whether an object passes through the detection area A1, A2 or A3, and the proximity distance of the object is determined at three levels. That is, without using a plurality of light-receiving devices 20 and light-emitting devices 10, it is possible to detect the presence/absence of an object over the detection areas A1, A2 and A3, and the same merit as that of the first embodiment can be achieved. In particular, since the power supply unit 40 and the control unit 30 are not required unlike the first embodiment, the miniaturization and the cost-reduction of the sensor can be further realized.

The above-described photoelectric sensor may be designed as follows. For example, a D/A converter circuit is provided in a subsequent stage of the detection circuit 60 to output the signal in the form of the analog output. Only one comparator is provided in the detection circuit 60 to change repeatedly the reference values $V_{th1}$, $V_{th2}$ and $V_{th3}$ in the predetermined pattern. That is, the photoelectric sensor may be configured to allow the light-emitting device 10 to emit light, compare the output level of the light-receiving device 20 with the reference value to output the result of comparison as a detection signal, change the reference value to compare the output level of the light-receiving device 20 with the reference value in each change in the reference value, and output the result of comparison as a detection signal. Even in such a detection signal, once timing changing the reference value is controlled, it is determined whether an object passes through the detection area A1, A2 or A3, and the proximity distance of the object can be determined at three levels. In particular, the LED for infrared rays and the light-receiving IC for remote controllers can be used as the light-emitting device and the light-receiving device, respectively. That is, when the carrier wave (burst wave) having the constant wavelength emitted from the LED for infrared rays is reflected from an object, the light-receiving IC for remote controllers receives and detects the carrier wave having the constant wavelength, and the received light intensity is equal to or more than one of a plurality of reference signals, determining that the object is present in the detection area corresponding to the reference value, a mode outputting the signal in the form of digital or analog may be adopted.

The photoelectric sensor according to the present invention is not limited to the above-described embodiments. For example, the detection areas are not limited to three areas, and it may be plural. For a type, an arranging method and the like of the light-emitting device and the light-receiving device, the design may be properly changed.

In the case of the photoelectric sensor according to the first embodiment of the present invention, since the light-emitting area of the light-emitting device is configured to be substantially enlarged/reduced through the change in the driving current of the light-emitting device, unlike in the case of the conventional example, it is possible to detect the presence/absence of an object over a plurality of detection areas without using a plurality of light-receiving devices and light-emitting devices. The present invention has the merit that the miniaturization and the cost-reduction of an apparatus are realized in that the increase in the number of light-emitting devices and light-receiving devices is not required.

In the case of the photoelectric sensor according to the first embodiment of the present invention, since the input of the external signal is configured not so as to be required in detecting the presence/absence of an object over a plurality of detection areas, the configuration of a peripheral circuit is simplified, and the present invention can realized the miniaturization and the cost-reduction of an apparatus in this point.

In the case of the photoelectric sensor according to the second embodiment of the present invention, the sensor utilizes the decrease in the light intensity of the reflected wave received with the light-emitting device in inverse proportion to the distance between an object to be detected and the light-emitting device and light-receiving device, and determines the presence/absence of an object on the basis of the output level of the light-receiving device. However, since the sensor has the configuration in which the reference value to become the criterion of the decision level is changed, unlike in the case of the conventional example, it is possible to detect the presence/absence of an object over a plurality of detection areas without using a plurality of light-receiving devices and light-emitting devices, and the second embodiment the present invention has the same merit as the first embodiment.

What is claimed is:

1. A photoelectric sensor for detecting the presence/absence of an object in a plurality of detection areas where a plurality of light-emitting areas of a light-emitting device and a single light-receiving area of a light-receiving device are overlapped with each other, the photoelectric sensor comprising:

a power supply unit for outputting a plurality of different values of driving current to the light-emitting device; and a control unit for outputting a plurality of different control signals to the power supply unit so as to make the power supply unit output said plurality of values of driving current, wherein during a period of outputting one of said plurality of control signals, the control unit determines whether or not an output level of said light-receiving device is equal to or larger than a reference value, and if the output level is determined to be equal to or larger than the reference value, the control unit determines that an object is present in one of the detection areas where one of the light-emitting areas and the light-receiving area are overlapped with each other and outputs a digital or analog detection signal.

2. The photoelectric sensor according to claim 1, wherein the control unit is configured to have the function of repeatedly changing said plurality of control signals in a predetermined pattern.

3. A photoelectric sensor for detecting the presence/absence of an object in a detection area where a light-emitting area of a light-emitting device and a light-receiving area of a light-receiving device are overlapped with each other, the photoelectric sensor being configured to allow the light-emitting device to emit light, compare an output level of the light-receiving device with a plurality of reference values different from one another, and output the result of comparison as a digital or analog detection signal in order to detect the presence/absence of the object over a plurality of detection areas, wherein in order to produce the detection signals based on the output levels of the light-receiving device, said plurality of reference values are repeatedly changed in a predetermined pattern and compared with the output level and the results of comparison are outputted in sequence.

* * * * *